(12) United States Patent
Mast et al.

(10) Patent No.: US 12,020,583 B2
(45) Date of Patent: Jun. 25, 2024

(54) SYSTEMS AND METHODS PROVIDING ASSIST-TO-LAND AND EMERGENCY LAND FUNCTIONS

(71) Applicant: HONEYWELL INTERNATIONAL INC., Charlotte, NC (US)

(72) Inventors: Michael Mast, Sun City, AZ (US);
Yuta Morioka, Tempe, AZ (US);
Jeffrey Glenn, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 8 days.

(21) Appl. No.: 17/180,954

(22) Filed: Feb. 22, 2021

(65) Prior Publication Data

US 2021/0287560 A1    Sep. 16, 2021

Related U.S. Application Data

(60) Provisional application No. 62/987,632, filed on Mar. 10, 2020.

(51) Int. Cl.
| | |
|---|---|
| *G08G 5/02* | (2006.01) |
| *B64C 9/00* | (2006.01) |
| *B64C 13/16* | (2006.01) |
| *B64D 43/00* | (2006.01) |
| *B64D 45/08* | (2006.01) |
| *G05D 1/00* | (2024.01) |
| *G08G 5/00* | (2006.01) |

(52) U.S. Cl.
CPC ............ *G08G 5/025* (2013.01); *B64C 9/00* (2013.01); *B64C 13/16* (2013.01); *B64D 43/00* (2013.01); *B64D 45/08* (2013.01); *G05D 1/042* (2013.01); *G05D 1/101* (2013.01); *G08G 5/0013* (2013.01)

(58) Field of Classification Search
CPC .................................................... G08G 5/025
See application file for complete search history.

(56) References Cited

U.S. PATENT DOCUMENTS

| | | | |
|---|---|---|---|
| 6,507,776 B1 | 1/2003 | Fox, III | |
| 6,739,556 B1 | 5/2004 | Langston | |

(Continued)

FOREIGN PATENT DOCUMENTS

| | | |
|---|---|---|
| AP | 2005229076 A1 * | 10/2005 |
| EP | 2434465 A2 | 3/2012 |

(Continued)

*Primary Examiner* — Jean Paul Cass
(74) *Attorney, Agent, or Firm* — Lorenz & Kopf LLP

(57) ABSTRACT

Flight guidance methods, systems, and aircraft systems providing assist-to-land and emergency land (EL) functions. The method includes generating a visual indication of the availability and status of an assist-to-land function and an EL function when the current altitude of the aircraft exceeds an altitude threshold. When in assist-to-land, visual and audible flight guidance can be generated to guide the pilot to a safe landing at a selected runway or at a best runway for the conditions. Functions can be activated by user manipulations of interface objects and/or by software determinations. Software determinations to enter the EL function can automatically control the flying of the aircraft along an approach profile to a safe landing at a nearest suitable airport. EL determinations can be made based on pilot incapacitation.

12 Claims, 5 Drawing Sheets

(56) References Cited

U.S. PATENT DOCUMENTS

| | | |
|---|---|---|
| 7,343,232 B2 | 3/2008 | Duggan et al. |
| 7,693,614 B2 | 4/2010 | Turung |
| 7,715,955 B2 | 5/2010 | Tatham et al. |
| 7,792,615 B2 | 9/2010 | Aimar |
| 7,896,293 B2 * | 3/2011 | Boissenin .............. B64C 13/16 |
| | | 244/187 |
| 8,032,267 B1 | 10/2011 | Simon |
| 8,108,086 B2 | 1/2012 | Bailly et al. |
| 8,180,503 B2 | 5/2012 | Estabrook et al. |
| 8,527,118 B2 | 9/2013 | Jones et al. |
| 8,761,965 B2 | 6/2014 | Righi et al. |
| 8,948,936 B2 | 2/2015 | Shue et al. |
| 9,310,222 B1 | 4/2016 | Suiter et al. |
| 9,786,189 B2 | 10/2017 | Loussides et al. |
| 10,114,381 B2 | 10/2018 | Haskins et al. |
| 10,203,700 B2 | 2/2019 | Haskins et al. |
| 10,242,580 B2 | 3/2019 | Groden et al. |
| 10,426,393 B2 * | 10/2019 | Bosworth .......... B64D 45/0051 |
| 10,467,913 B1 | 11/2019 | Suiter et al. |
| 10,540,904 B2 | 1/2020 | Quellette |
| 10,620,641 B2 | 4/2020 | Haskins et al. |
| 10,766,605 B2 | 9/2020 | Offredi et al. |
| 2007/0050100 A1 | 3/2007 | Gustafson et al. |
| 2007/0055434 A1 | 3/2007 | Kohlmann |
| 2008/0039988 A1 * | 2/2008 | Estabrook ........... G08G 5/0013 |
| | | 701/14 |
| 2010/0004803 A1 | 1/2010 | Manfredi et al. |
| 2010/0305786 A1 * | 12/2010 | Boorman ............ G08G 5/0021 |
| | | 701/16 |
| 2013/0179011 A1 | 7/2013 | Colby et al. |
| 2015/0032299 A1 * | 1/2015 | Puyou ................... B64C 13/16 |
| | | 701/16 |
| 2016/0027336 A1 * | 1/2016 | Towers ................... G09B 9/10 |
| | | 434/220 |
| 2016/0139603 A1 * | 5/2016 | Bianchi ................ G01S 19/396 |
| | | 701/4 |
| 2017/0092137 A1 * | 3/2017 | Hiebl .................... G05D 1/0022 |
| 2017/0249852 A1 * | 8/2017 | Haskins .............. G08G 5/0086 |
| 2017/0277201 A1 * | 9/2017 | Bredenbeck .......... B64D 35/06 |
| 2018/0148192 A1 * | 5/2018 | Haskins .............. G08G 5/0039 |
| 2018/0222602 A1 | 8/2018 | Salesse-Lavergne |
| 2018/0304993 A1 | 10/2018 | Offredi et al. |
| 2018/0364707 A1 | 12/2018 | Bosworth et al. |
| 2019/0090800 A1 | 3/2019 | Bosworth et al. |
| 2019/0094886 A1 * | 3/2019 | Haskins .............. G08G 5/0086 |
| 2019/0129448 A1 * | 5/2019 | Haskins .............. G05D 1/0676 |
| 2019/0378422 A1 | 12/2019 | Rankin et al. |
| 2019/0392719 A1 | 12/2019 | Parker et al. |
| 2021/0034053 A1 | 2/2021 | Nikolic et al. |

FOREIGN PATENT DOCUMENTS

| | | | |
|---|---|---|---|
| EP | 3459857 A1 * | 3/2019 | ........... A61B 5/0015 |
| GB | 2543503 A | 4/2017 | |
| WO | 2012145608 A1 | 10/2012 | |

\* cited by examiner

SYSTEMS AND METHODS PROVIDING ASSIST-TO-LAND AND EMERGENCY LAND FUNCTIONS

CROSS REFERENCE TO RELATED APPLICATIONS

This application claims priority to Provisional Patent Application No. 62/987,632, filed Mar. 10, 2020, the entire content of which is incorporated by reference herein.

TECHNICAL FIELD

The following disclosure relates generally to flight guidance systems and, more particularly, to flight guidance systems and methods providing assist-to-land and emergency land functions for aircraft.

BACKGROUND

Several undesirable flight scenarios can occur when a pilot needs to land an aircraft. Examples include the pilot having an inability to visually locate a runway upon a final approach; the pilot experiencing spatial disorientation, and the pilot being uncertain about how to proceed (for example, in a low fuel condition during the low visibility conditions). These flight scenarios present objective technical problems for a pilot.

In these flight scenarios, a pilot may desire additional flight guidance, above what is provided by available flight guidance systems. In some scenarios, the pilot may desire assistance to fly to a desired waypoint (such as, a published MUH (Minimum Use Height)), after which point the pilot expects to take over the aircraft and proceed to land under VFR (Visual Flight Rules) procedures. In other scenarios, the pilot may wish to have step by step instructions to land the aircraft. Further still, in some scenarios, the pilot may need the aircraft to automatically perform an emergency landing, without further pilot input.

Accordingly, improved methods, systems, and aircraft systems providing guidance are desirable. The desired flight guidance system will provide assist-to-land and emergency land functions for an aircraft. Furthermore, other desirable features and characteristics of the present invention will be apparent from the subsequent detailed description and the appended claims, taken in conjunction with the accompanying drawings and the foregoing technical field and background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

Provided is a flight guidance system for an aircraft, including: a source of aircraft status data; a display device configured to render an avionic display showing a location and trajectory of the aircraft; a source configured to provide an activate command; a controller architecture operationally coupled to the source of aircraft status data, display device, and source configured to provide an activate command, the controller architecture programmed by programming instructions to: activate an assist-to-land function responsive to receiving the activate command; and responsive to activating the assist-to-land function: determine whether an automatic pilot (AP) can be engaged and whether an auto-thrust (AT) system can be engaged; and upon determining that the AP and AT can be engaged, actively controlling the AP and AT to level the aircraft; generate a plurality of assist-to-land flight plans to land the aircraft; and display the plurality of assist-to-land flight plans and associated visual alerts on the avionic display.

Also provided is another flight guidance system for an aircraft. The system includes: a source of aircraft status data; a display device configured to render an avionic display showing a location and trajectory of the aircraft; a source configured to provide an emergency land (EL) activate command; a controller architecture operationally coupled to the source of aircraft status data, display device, and source configured to provide an emergency land (EL) activate command, the controller architecture programmed by programming instructions to: receive the EL activate command, and begin an EL function responsive to the EL activate command; while in EL function, perform the operations of: selecting a nearest suitable airport and associated route; actively controlling the AP and AT to fly the aircraft along the route to a final approach fix; automatically communicating with air traffic control (ATC); automatically configuring the aircraft for landing; and automatically landing the aircraft at the nearest suitable airport.

A flight guidance method for an aircraft is provided. The method includes: at a controller architecture comprising a processor, performing the operations of: receiving aircraft status data; commanding a display device to render an avionic display showing a location and trajectory of the aircraft; receiving an activate command; activating an assist-to-land function responsive to receiving the activate command; and while the assist-to-land function is activated, performing the operations of: determining whether an automatic pilot (AP) can be engaged and whether an auto-thrust (AT) system can be engaged; and upon determining that the AP and AT can be engaged, actively controlling the AP and AT to level the aircraft; generating a plurality of assist-to-land flight plans to land the aircraft; and displaying the plurality of assist-to-land flight plans and associated visual alerts on the avionic display.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. The term "exemplary," as appearing throughout this document, is synonymous with the term "example" and is utilized repeatedly below to emphasize that the description appearing in the following section merely provides multiple non-limiting examples of the invention and should not be construed to restrict the scope of the invention, as set-out in the Claims, in any respect. As further appearing herein, the term "pilot" encompasses all users of the below-described flight guidance system.

OVERVIEW

Flight guidance systems and methods for an aircraft are provided. Embodiments provide an assist-to-land function and an emergency land function for an aircraft. Each function is designed to respond to either manual engagement by a passenger/crew or automatic engagement, via a triggering of pre-programmed thresholds or other activation functions.

The assist-to-land function can provide step by step instructions to get a pilot to a desired waypoint, or step by step instructions to land the aircraft. The emergency land function is envisioned as an extension of the assist-to-land function: as an emergency function for a potentially incapacitated pilot. The emergency land function is also referred to herein as an auto land function. During the emergency land function, the system will become fully autonomous, automatically configure the aircraft for landing, and provide automatic flare and centerline guidance to a full stop condition. In various embodiments, the emergency land function can be activated by applications that perform pilot incapacitation detection methods.

The flight guidance system provides a heightened intelligence over existing flight guidance systems with its assist-to-land and emergency auto land functions; this manifests as an objectively improved human-machine interface (HMI). Generally, this heightened intelligence will remain transparent to the pilot, as few, if any, additional pilot interactions will be required by the flight guidance system under typical circumstances. An overarching description of an exemplary flight guidance system suitable for performing such processes will now be described in conjunction with FIG. 1.

Figure 1:
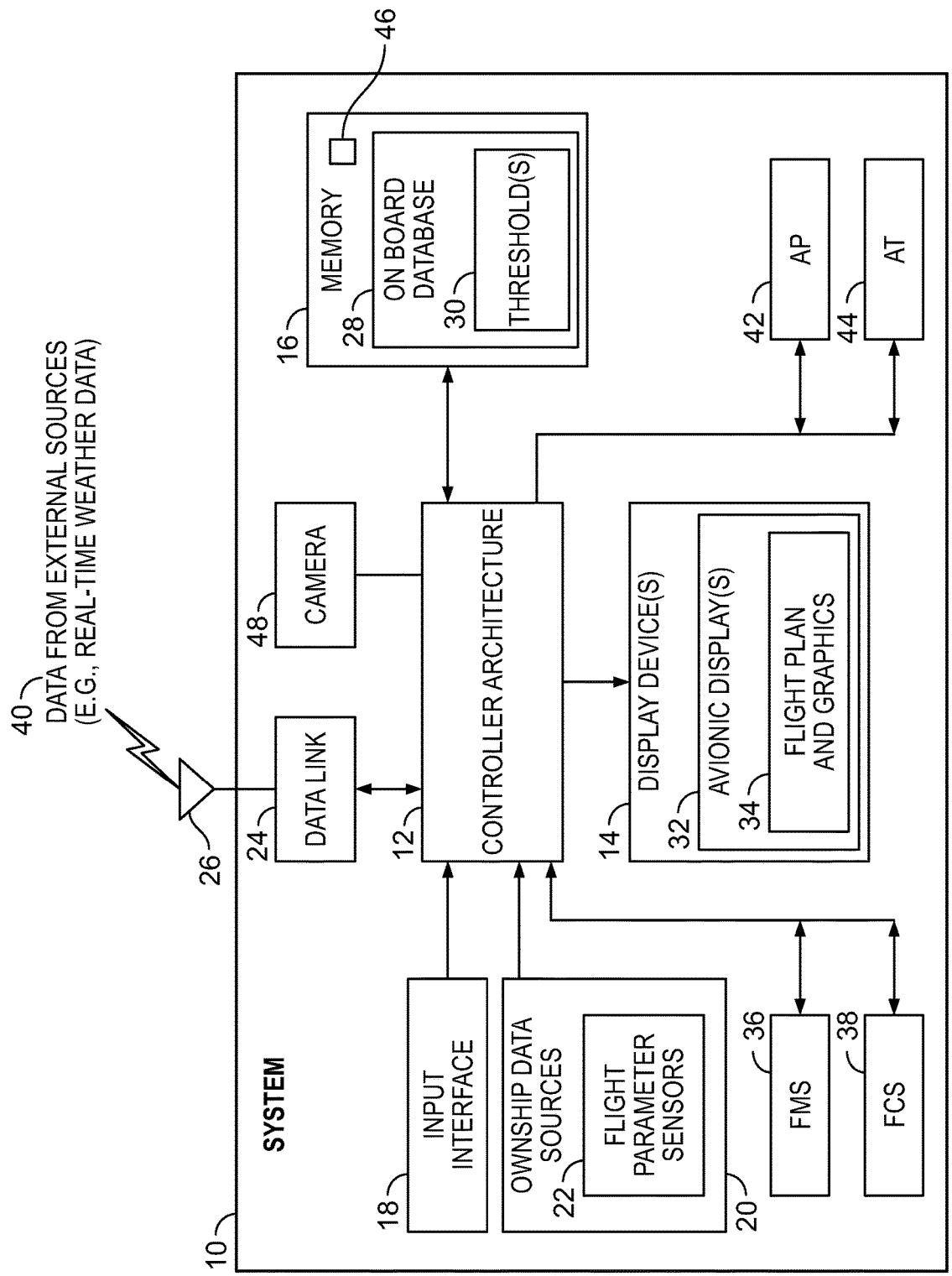
FIG. 1 is a block diagram of a flight guidance system, which supports improved assist-to-land and emergency land functions, in accordance with an exemplary embodiment of the present disclosure.

FIG. 1 is a block diagram of a flight guidance system 10, as illustrated in accordance with an exemplary and non-limiting embodiment of the present disclosure. Flight guidance system 10 provides an assist-to-land function and an emergency land function for an ownship aircraft (A/C); e.g., flight guidance system 10 may be utilized onboard a non-illustrated A/C, which carries or is equipped with system 10. As schematically depicted in FIG. 1, flight guidance system 10 includes the following components or subsystems, each of which may assume the form of a single device or multiple interconnected devices: a controller architecture 12, at least one display device 14, computer-readable storage media or memory 16, a pilot input interface 18, an automatic-pilot system (AP) 42 and an automatic throttle system (AT) 44.

Flight guidance system 10 may further contain ownship data sources 20 including on-board sensors of temperature, humidity, pressure, and the like. In various embodiments, ownship data sources include an array of flight parameter sensors 22. In various embodiments, flight guidance system 10 includes a camera 48 oriented in a cockpit to take pictures of the user/pilot.

The flight guidance system 10 may be separate from or integrated with: flight management system (FMS) 36 and a flight control system (FCS) 38. Flight guidance system 10 may also contain a datalink subsystem 24 including an antenna 26, which may wirelessly transmit data to and receive data (40) from various sources external to system 10, such as a cloud-based weather (WX) forecasting service of the type discussed below.

Although schematically illustrated in FIG. 1 as a single unit, the individual elements and components of flight guidance system 10 can be implemented in a distributed manner utilizing any practical number of physically-distinct and operatively-interconnected pieces of hardware or equipment. When system 10 is utilized to construct supersonic flight plans for a manned A/C, the various components of flight guidance system 10 will typically all be located onboard the A/C.

The term "controller architecture," as appearing herein, broadly encompasses those components utilized to carry-out or otherwise support the processing functionalities of flight guidance system 10. Accordingly, controller architecture 12 can encompass or may be associated with any number of individual processors, flight control computers, navigational equipment pieces, computer-readable memories (including or in addition to memory 16), power supplies, storage devices, interface cards, and other standardized components. In various embodiments, controller architecture 12 is embodied as an enhanced computer system that includes or cooperates with at least one firmware and software program 46 (generally, computer-readable instructions that embody an algorithm) for carrying-out the various process tasks, calculations, and control/display functions described herein. During operation, the controller architecture 12 may be pre-programmed with, or load and then execute the at least one firmware or software program 46 to thereby perform the various process steps, tasks, calculations, and control/display functions described herein.

Controller architecture 12 may utilize the datalink 24 to exchange data with one or more external sources 40 to support operation of flight guidance system 10 in embodiments. In various embodiments, the datalink 24 functionality is integrated within the controller architecture 12. In various embodiments, bidirectional wireless data exchange may occur over a communications network, such as a public or private network implemented in accordance with Transmission Control Protocol/Internet Protocol architectures or other conventional protocol standards. Encryption and mutual authentication techniques may be applied, as appropriate, to ensure data security.

Memory 16 can encompass any number and type of storage media suitable for storing computer-readable code or instructions, such as the aforementioned software program, as well as other data generally supporting the operation of flight guidance system 10. In certain embodiments, memory 16 may contain one or more databases 28, such as geographical (terrain), airport features database (providing runways and taxiways), navigational, and historical weather databases, which may be updated on a periodic or iterative basis to ensure data timeliness. The databases maintained in memory 16 may be shared by other systems onboard the A/C carrying flight guidance system 10, such as an Enhanced Ground Proximity Warning System (EGPWS) or a Runway Awareness and Advisory System (RAAS). Memory 16 may also store the software program 46 and/or one or more threshold values, as generically represented by box 30. In various embodiments, the controller architecture 12 has integrated therein suitable memory for processing calculations and for storing the software program 46 and/or the thresholds 30.

Flight parameter sensors 22 supply various types of data or measurements to controller architecture 12 during A/C flight. In various embodiments, flight parameter sensors 22 provide data and measurements from a Full Authority Digital Engine Control (FADEC), such data or measurements may include engine status (e.g., an engine-out (EO) condition signal) and fuel flow to the engine. In A/C not having a FADEC, engine status and fuel flow may be determined based on monitored generator current in the engine.

In various embodiments, the flight parameter sensors 22 also supply aircraft status data for the aircraft, including, without limitation: airspeed data, groundspeed data, altitude data, attitude data including pitch data and roll measurements, heading information, flight track data, inertial reference system measurements, Flight Path Angle (FPA) measurements, and yaw data. In various embodiments, aircraft status data for the aircraft also includes one or more of: flight path data, data related to A/C weight, time/date information, remaining battery time, data related to atmospheric conditions, radar altitude data, geometric altitude data, wind speed and direction data. Further, in certain embodiments of system 10, controller architecture 12 and the other components of flight guidance system 10 may be included within or cooperate with any number and type of systems commonly deployed onboard A/C including, for example, an FMS 36, an Attitude Heading Reference System (AHRS), an Instrument Landing System (ILS), and/or an Inertial Reference System (IRS), to list but a few examples.

With continued reference to FIG. 1, display device 14 can include any number and type of image generating devices and respective display drivers to generate one or more avionic displays. The display device 14 can embody a touch-screen display. When flight guidance system 10 is utilized to construct flight plans for a manned A/C, display device 14 may be affixed to the static structure of the A/C cockpit as, for example, a Head Down Display (HDD) or Head Up Display (HUD) unit. Alternatively, display device 14 may assume the form of a movable display device (e.g., a pilot-worn display device) or a portable display device, such as an Electronic Flight Bag (EFB), a laptop, or a tablet computer carried into the A/C cockpit by a pilot.

At least one avionic display 32 is generated on display device 14 during operation of flight guidance system 10; the term "avionic display" defined as synonymous with the term "aircraft-related display" and encompassing displays generated in textual, graphical, cartographical, and other formats. Avionic display 32 is generated to include various visual elements or flight plan graphics 34, which may be referenced by a pilot during the EO condition. The graphics 34 can include, for example, textual readouts relating to airport selection criteria or text annunciations indicating whether flight guidance system 10 is able to select an airport satisfying such airport selection criteria. The avionic display or displays 32 generated by flight guidance system 10 can include alphanumerical input displays of the type commonly presented on the screens of MCDUs, as well as Control Display Units (CDUs) generally. The avionic display or displays 32 generated by flight guidance system 10 can also generate various other types of displays on which symbology, text annunciations, and other graphics pertaining to flight planning. Embodiments of flight guidance system 10 can generate various graphics 34 on one or more two dimensional (2D) avionic displays, such as a horizontal or vertical navigation display; and/or on one or more three dimensional (3D) avionic displays, such as a Primary Flight Display (PFD) or an exocentric 3D avionic display. In some embodiments, the display device(s) 14 have integrated therein the necessary drivers and audio devices to additionally provide aural alerts, emitting sounds and speech.

Via various display and graphics systems processes (FIG. 2, 206), the graphics 34 on the avionic display or displays 32 can include a displayed button to activate the functions and various alphanumeric messages overlaid on a lateral display or a vertical display. The avionic display or displays 32 generated by flight guidance system 10 can also generate various other types of displays on which symbology, text annunciations, and other graphics pertaining to flight planning. Embodiments of flight guidance system 10 can generate graphics 34 on one or more two dimensional (2D) avionic displays, such a horizontal or vertical navigation display; and/or on one or more three dimensional (3D) avionic displays, such as a Primary Flight Display (PFD) or an exocentric 3D avionic display.

In various embodiments, a human-machine interface (HMI), such as the above described touch screen display, is implemented as an integration of the user interface 18 and a display device 14. Via various display and graphics systems processes, the controller circuit 12 may command and control the touch screen display generating a variety of graphical user interface (GUI) objects or elements described herein, including, for example, buttons, sliders, and the like, which are used to prompt a user to interact with the HMI to provide user input, and to activate respective functions and provide user feedback, responsive to received user input at the GUI element.

Figure 2:
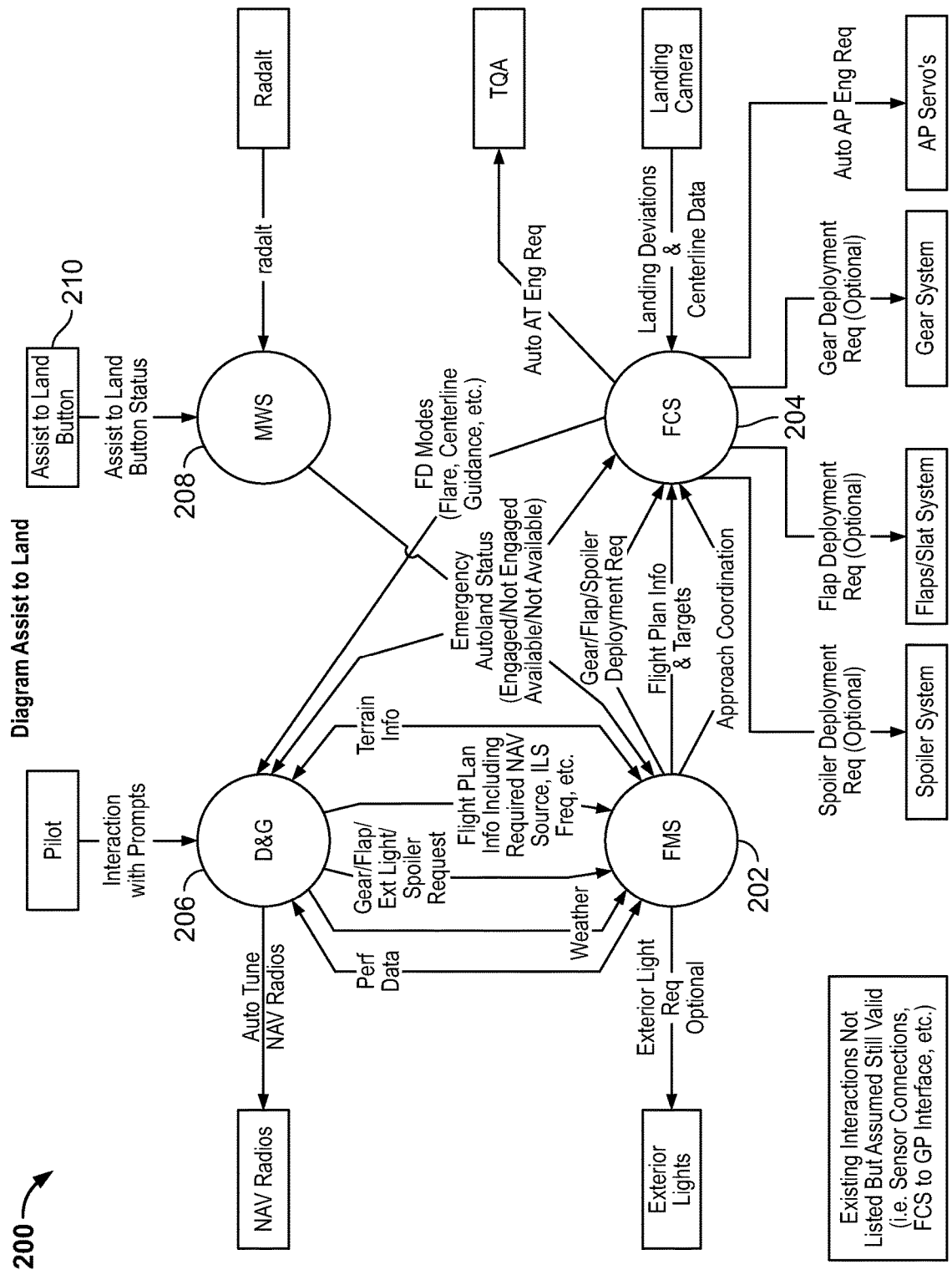
FIG. 2 is a process diagram setting-forth an exemplary partition of process steps that can be carried-out by the flight guidance system of FIG. 1, for an assist-to-land function, as illustrated in accordance with an exemplary embodiment of the present disclosure.
Figure 3:
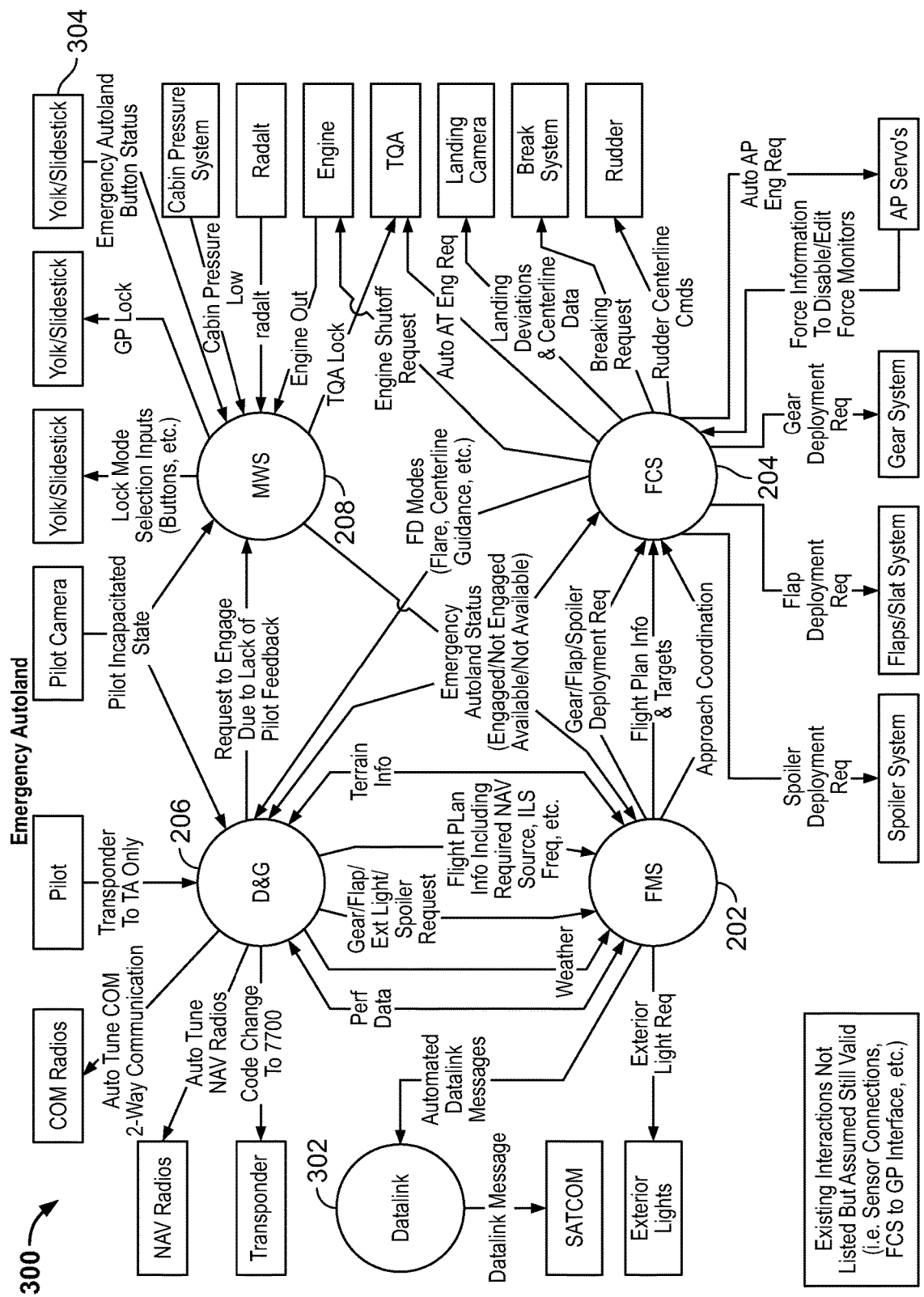
FIG. 3 is a process diagram setting-forth an exemplary partition of process steps that can be carried-out by the flight guidance system of FIG. 1, for an emergency land functions, in accordance with an exemplary embodiment of the present disclosure.

FIG. 2 is an exemplary process diagram 200 for the flight guidance system 10 (FIG. 1) for an assist-to-land function. FIG. 3 is an exemplary process diagram 300 for the flight guidance system 10 (FIG. 1) for an emergency land function.

In various embodiments, process steps based on the process diagram 200 and the process diagram 300 are embodied in an algorithm encoded into a software program 46 and executed as computer-implemented functions or process steps, such as, by the controller architecture 12. In some embodiments, the process steps are aggregated into larger process blocks, and the controller architecture 12 directs or delegates the aggregated larger process blocks to various systems on-board the A/C to perform. In various embodiments, the process blocks are referred to as modules.

In FIG. 2 and FIG. 3, the process blocks are aggregated into four large process blocks or modules: A Flight Management System (FMS) process 202 block, a Flight Control System (FCS) process 204 block, a Monitor Warning System (MWS) process 208 block, and a display and graphics (D&G) process 206 block. The process diagram 300 additionally has a datalink system process 302 block. Each process block or module may entail a single process or multiple sub-processes. The arrangement of process blocks shown in FIG. 2 and in FIG. 3, described below, are provided by way of non-limiting example only.

In various embodiments, the controller architecture 12 first determines whether auto land and emergency land modes are available, e.g., when a current altitude of the aircraft exceeds a first altitude threshold; and, responsive thereto, the controller architecture 12 generates and displays one or more visual indications and aural alerts that indicate the availability of auto land and emergency land modes, their engagement status (i.e. engaged, failed, etc.) consistent with current cockpit philosophy. CAS (Crew Alerting System) alerting is provided when emergency land function is attempted to be engaged but is unavailable. In other embodiments, auto land and emergency land modes are available automatically.

Activation

Assist-to-land can be activated via several sources. In an embodiment, a source for activating the assist-to-land function is a manual input, via a physical switch/button 210 in the cockpit. In these embodiments, the assist-to-land function may be initiated when the system 10 receives a pilot selection of a physical switch/button 210 that is the user input device. Physical switch/button 210 is designed to be easy to recognize, but difficult enough to engage to avoid nuisance activations of the assist-to-land function. In some embodiments, the source for activating the assist-to-land function may be a guarded switch; in another embodiment, the source for activating the assist-to-land function may be a requirement to press a button for a duration of time; in various embodiments, the duration of time may be determined with the OEM may be preferred. In various embodiments, the switches and buttons may be either physical objects or GUI objects, manipulated by a pilot.

Regardless of the source for assist-to-land activation, the controller architecture 12 activates an assist-to-land function responsive to receiving the activate command. Upon activation, the controller architecture 12 seeks to level the aircraft, which it will do with an automatic pilot (AP) and an auto-thrust (AT) system, if they can be engaged. If the controller architecture 12 determines they can be engaged, it actively controls the AP and AT to level the aircraft. Concurrent with leveling the aircraft, the controller architecture 12 also generates a plurality of assist-to-land flight plans to land the aircraft; and displays the plurality of assist-to-land flight plans and associated visual alerts on the avionic display.

As mentioned, in various embodiments, the assist-to-land function is only available after the system 10 determines that the aircraft has cleared (i.e., a current altitude of the aircraft exceeds) a preprogrammed minimum altitude, to avoid nuisance activation during a takeoff phase of flight. This preprogrammed minimum altitude may be referred to as a first altitude threshold. The first altitude threshold may be determined by the OEM. The system 10 may generate a visual indication of the availability of an assist-to-land function when the current altitude of the aircraft exceeds the first altitude threshold. Additionally, when the current altitude of the aircraft exceeds the first altitude threshold, the system 10 may generate a visual indication of a status of the assist-to-land function when the current altitude of the aircraft exceeds the first altitude threshold. In these embodiments, the controller architecture 12 is further programmed to: determine whether a current altitude of the aircraft exceeds a first altitude threshold; generate a visual indication of the availability of an assist-to-land function when the current altitude of the aircraft exceeds the first altitude threshold; and wherein receiving the activate command is after the generation of the visual indication of the availability of the assist-to-land function.

As mentioned, in various embodiments, the assist-to-land function is only available after the system 10 determines that the aircraft has cleared (i.e., a current altitude of the aircraft exceeds) a preprogrammed minimum altitude, to avoid nuisance activation during a takeoff phase of flight. This preprogrammed minimum altitude may be referred to as a first altitude threshold. The first altitude threshold may be determined by the OEM. The system 10 may generate a visual indication of the availability of an assist-to-land function when the current altitude of the aircraft exceeds the first altitude threshold. Additionally, when the current altitude of the aircraft exceeds the first altitude threshold, the system 10 may generate a visual indication of a status of the assist-to-land function when the current altitude of the aircraft exceeds the first altitude threshold. In these embodiments, the controller architecture 12 is further programmed to: determine whether a current altitude of the aircraft exceeds a first altitude threshold; generate a visual indication of the availability of an assist-to-land function when the current altitude of the aircraft exceeds the first altitude threshold; and wherein receiving the activate command is after the generation of the visual indication of the availability of the assist-to-land function.

Likewise, in various embodiments, the emergency land function is only available after the system 10 determines that the aircraft has cleared a preprogrammed second altitude threshold, which also may be determined by the OEM, to avoid nuisance activation during takeoff phase of flight. The preprogrammed first altitude threshold and preprogrammed second altitude threshold may be the same. In these embodiments, when the current altitude of the aircraft exceeds the second altitude threshold, the system 10 may generate a visual indication that an emergency land function is available. In various embodiments, these visual indications include text boxes or GUI objects indicating available, engaged, failed, etc., displayed on the avionic display 32, consistent with a preselected cockpit display protocol/layout.

In various embodiments, the system 10 may make availability of the assist-to-land function further restricted to only upon condition that a selected runway and a flight plan input have been received. In various embodiments, the source for the selected runway and the flight plan is the FMS 36. In various embodiments, the avionic displays 32 generate visual indications of the availability of the assist-to-land function and of the status of the assist-to-land function (i.e. text boxes or GUI objects indicating available, engaged, failed, etc.) consistent with a preselected cockpit display protocol/layout. Various embodiments of system 10 provide CAS alerting responsive to detecting that the assist-to-land function was attempted to be engaged when that the assist-to-land function is unavailable.

The system 10 has a source configured to provide an activate command, to activate the assist-to-land function. In various embodiments, the system 10 additionally has a source configured to provide an emergency land (EL) activate command, to activate the emergency land (EL) function. In various embodiments, the source configured to activate the assist-to-land function and/or the source configured to activate the EL function include a switch/button 304 that is asserted/activated by a user selection, the switch/button 304 being part of a user interface 18 in the cockpit. The switch/button 304 may be a physical object or a GUI object. The switch/button 304 may be designed to be easy to recognize, but difficult enough to engage to avoid nuisance activations.

After viewing the visual indication of the availability of an assist-to-land function, the pilot may assert the activate command by manipulating an object on the user interface 18. Likewise, subsequent to viewing the visual indication that an emergency land function is available, the pilot or crew may assert the EL activate command by manipulating an object on the user interface 18.

In various embodiments, the source configured to provide an EL activate command may further include a software EL determination, made by the controller architecture 12. In these embodiments, the system 10 asserts the EL activate command, which manifests as an automatic transition to the EL function, responsive to the EL determination. In an example, the system 10 may make the EL determination (i.e., causing an automatic transition to emergency land) responsive to detecting a lack of pilot response to a prompt for a preprogrammed/tailorable threshold of time (reflecting potential pilot incapacitation). In some embodiments, the system 10 may make the EL determination responsive to detecting a problem based on input from on-board sensors, such as, responsive to detecting a cabin depressurization that has met a minimum pressure threshold.

Additionally, in various embodiments, the system 10 may make the EL determination responsive to determining that the pilot is incapacitated. The system 10 may determine pilot incapacitation using a pilot incapacitation function (e.g., encoded in program 46). Non-limiting examples of a pilot incapacitation function include: obtaining an eyelid position or pupil dilation input, via a cockpit camera 48, and processing this input with visual algorithms included in program 46 to measure of pilot incapacitation; and, processing a plurality of pilot inputs over a period of time with pilot state-determination logic included in program 46 to determine whether the pilot is not following expected actions, as a proxy of pilot incapacitation. As mentioned, the avionics displays 32 may provide visual and aural alerts to the pilot, responsive to a detection of a pilot incapacitation.

Responsive to the detection of a pilot incapacitation, in some embodiments, the controller architecture 12 may generate a prompt for the pilot to manually cancel an impending automatic activation of the emergency land function prior to the automatic activation of the emergency land function. In one embodiment, the prompt is a GUI object with a timer countdown that is displayed while counting down.

Automatic Activation of AP/AT

In various embodiments, responsive to activation of the assist-to-land function, the FCS 38 automatically activates the AT 44 and AP 42 functions if they are functioning. In various embodiments, responsive to activation of the assist-to-land function, the controller architecture 12 determines whether the AP 42 or AT 44 can be engaged (i.e., are functioning). Upon determining that the AP 42 or AT 44 has failed, the controller architecture 12 provides a respective notification and displays guidance (on the avionic display 32) for manual maneuvering to land at a selected airport. In various embodiments, the selected airport is provided by a source of a selected runway and flight plan; in various embodiments, the FMS 36 is the source of a selected runway and flight plan. Upon determining that the AP 42 and AT 44 have not failed (i.e., are functioning), the controller architecture 12 begins the assist-to-land descent and, accordingly, begins commanding the AP 42 and AT 44 to land the aircraft, as described below.

Automatic Flight Plan to Land

Figure 4:
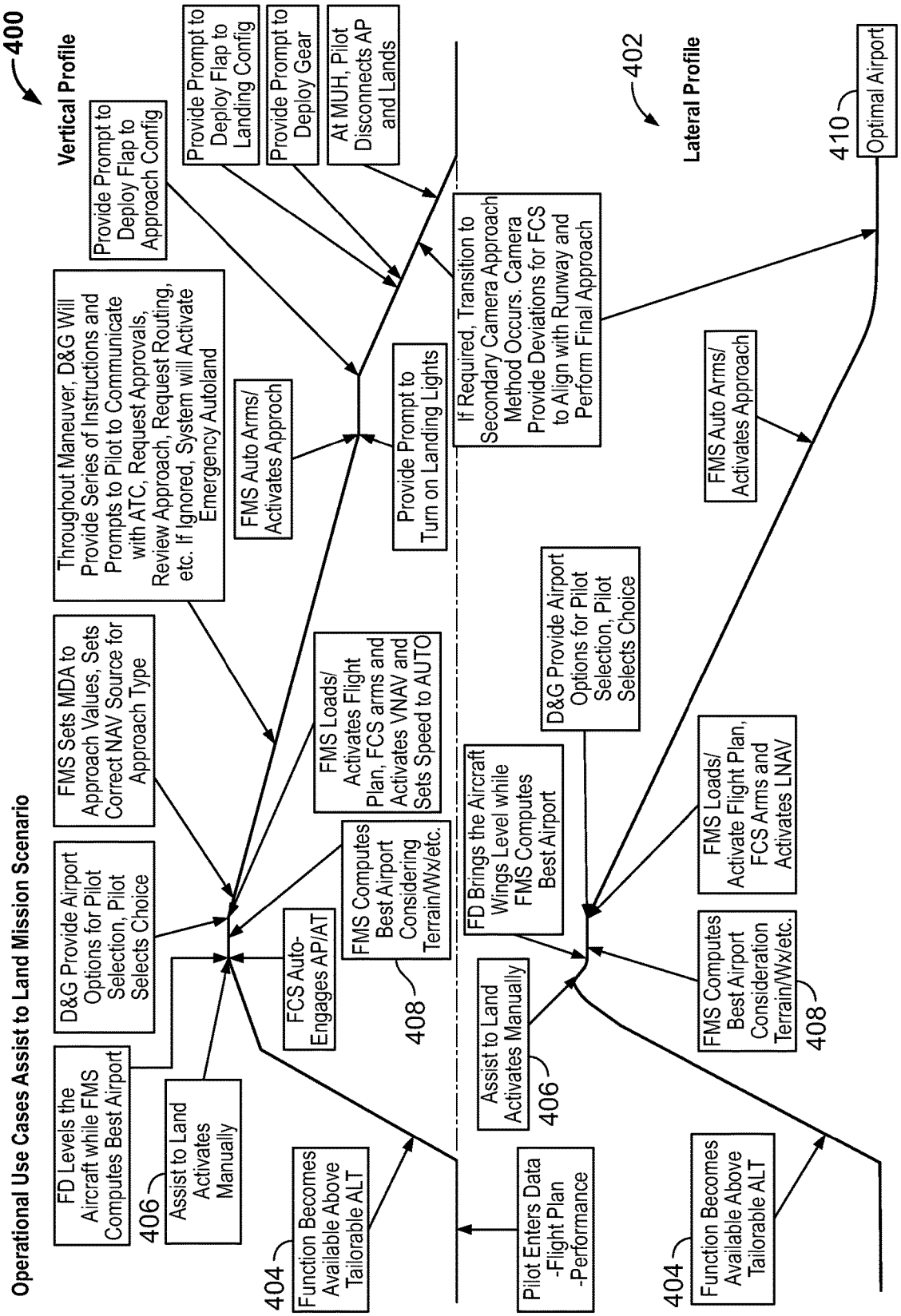
FIG. 4 is a diagram that depicts steps in an operational use case for an assist-to-land function, in accordance with an exemplary embodiment of the present disclosure.
Figure 5:
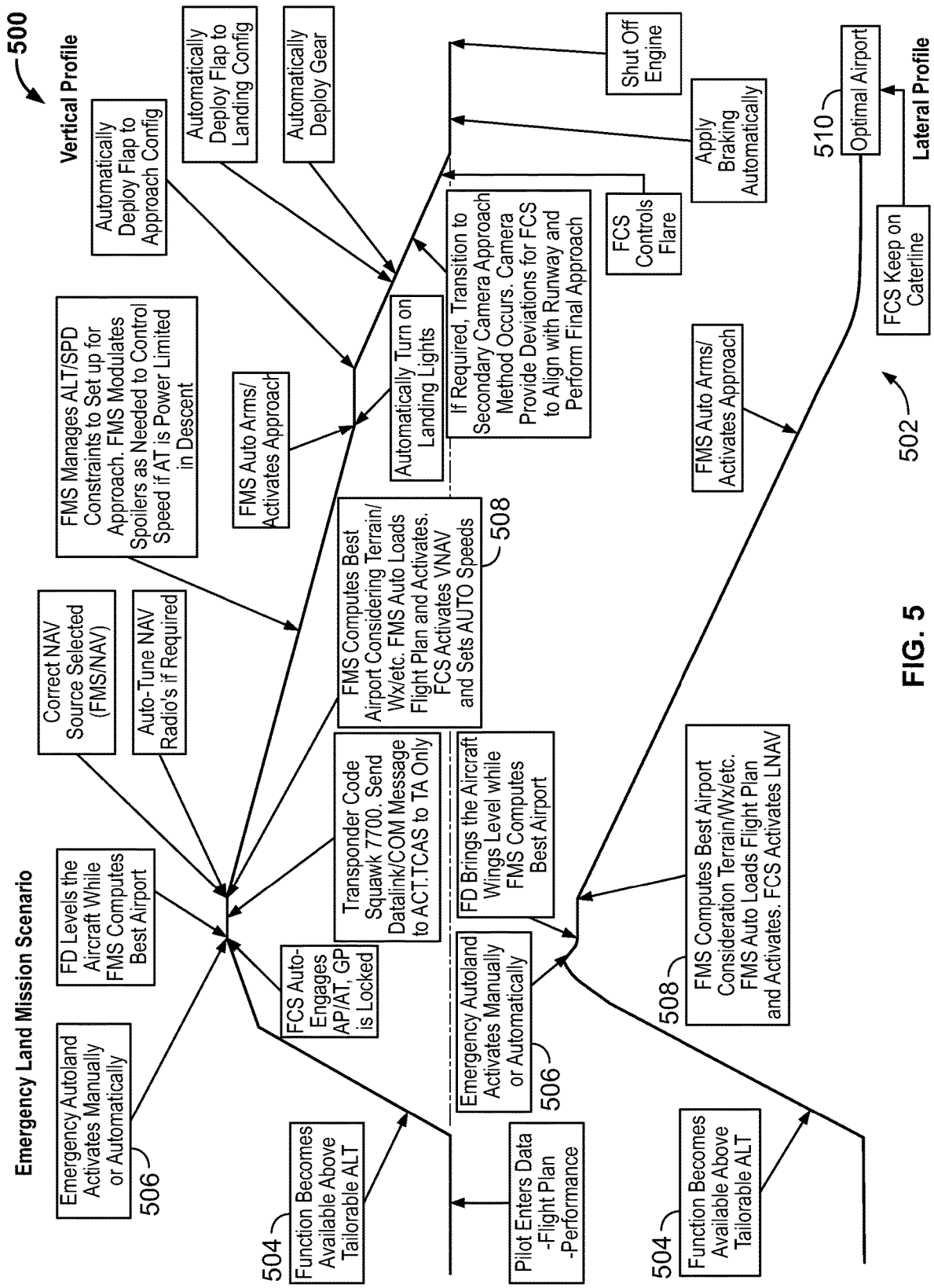
FIG. 5 is a diagram that depicts steps in an operational use case for an emergency land function, in accordance with an exemplary embodiment of the present disclosure.

As mentioned, responsive to activation of the assist-to-land function, and provided that AP 42 and AT 44 have not failed, the assist-to-land descent begins and actively controls the aircraft to land at the selected airport. Accordingly, responsive to activation of the assist-to-land function, the controller architecture 12 automatically generates a flight plan, displays it, and generates associated aural and visual alerts. In various embodiments, avionic displays 32 indicate unique flight mode annunciations (FMA's) to the crew. Flight mode annunciation (FMA) indications are unique to the assist-to-land function. FIGS. 4-5 provide examples of the FMA indications.

Responsive to activation of the assist-to-land function, the controller architecture 12 may determine a best airport and approach type/profile, and visually distinguish the assist-to-land flight plan for the best airport and approach profile from remaining flight plans and approach profiles on the avionic display. To determine the best airport and approach profile, the controller architecture may process inputs such as terrain, obstacles, weather, aircraft-specific approach capabilities, runway lengths, range, on-ground weather conditions, etc., using a runway algorithm in program 46.

As mentioned, responsive to activation of the assist-to-land function, the controller architecture 12 actively controlling the AP 42 and AT 46 to land the aircraft at the selected airport, in accordance with the assist-to-land flight plan; this may include generating commands for aircraft systems, as necessary, to level the aircraft while the flight plan is being updated. In an example, responsive to activation of the assist-to-land function, the controller architecture 12 may command the FCS 38 to activate a flight director lateral mode (annunciated to the crew as ROL) which commands a wings level lateral command, this may also be referred to as ROL (WNG_LVL) and activate flight path angle (FPA) with a target FPA of 0 degrees to level the aircraft and await FMS flight plan activation. Additionally, the activation of ROL/FPA will occur immediately, responsive to activation of the assist-to-land function, to level the aircraft while the pilot makes a target runway selection. Some delay may occur into the descent and lateral maneuvering portion of the assist-to-land mode until the selection has occurred. In the emergency land function, the activation of ROL and FPA, as described, will occur automatically and fairly quickly, however the controller architecture 12 assures that the aircraft is leveled for the duration of the activation of ROL and FPA.

The controller architecture 12 may interface with an instrument navigation (INAV) onboard terrain/obstacle database to provide terrain awareness. The controller architecture 12 may interface with the INAV weather (WX) layers to determine en route weather.

In various embodiments, if a selected airport was previously entered, the controller architecture 12 may determine and display a number of additional optional airports in with the display of the selected airport, and prompt a pilot to select among the displayed airports for further information and flight guidance to the pilot selection. In various embodiments, the controller architecture 12 may give a higher priority to a flight plan to the selected airport than other displayed airports, if it determines landing is possible at the selected airport. Additionally, in various embodiments, the controller architecture 12 may determine an approach profile to a different airport for pilot review. In various embodiments, the controller architecture 12 may prompt for pilot review, e.g., via a D&G process 204, with a visual alert comprising a one-step activation suggestion to the crew to activate the determined approach profile.

In various embodiments, responsive to receiving an EL activate command, the controller architecture 12 activates the EL function. In activating the EL function, the controller architecture 12 may select a different airport from the selected airport if the different airport provides a quicker option and speed is a priority. In various embodiments, the system 10 generates associated visual alerts, such as, text or icons to denote locations of expected flap/gear deployment and displays them alongside the newly determined approach profile on the avionics displays 32.

In various embodiments, while in EL function, the system perform the operations of: selecting a nearest suitable airport and associated route; actively controlling the AP and AT to fly the aircraft along the route to a final approach fix; automatically communicating with air traffic control (ATC); automatically configuring the aircraft for landing; and automatically landing the aircraft at the nearest suitable airport. As used herein, "automatically" means immediately and without requiring further human input.

The controller architecture 12 assures that visual alerts do not fully cover a lateral map with the flight plan and graphics 34 displayed on the avionic display 32, so pilot can visually inspect the suggestions without losing sight of the current flight path. In various embodiments, the controller architecture 12 does this by rendering a prompt somewhere on a displayed lateral map or vertical situation display, dedicating about ⅙ of the window area on the multi-function display (MFD) or touch screen display (TSC) to the prompt. It is to be understood that the avionics displays 32 are re-scaled and re-centered, responsive to pilot selections.

In various embodiments, the controller architecture 12 will, in response to receiving a pilot selection (i.e., activation) of one of the selectable flight plans, provide confirmation to FCS 38 that the flight plan has been loaded and activated, at which point LNAV/VNAV will be armed and activated. In various embodiments, the controller architecture 12 will use GPS altitude for approach calculations when it determines that it cannot be ensured the correct barometric setting has been received. In various embodiments where ILS approach is optimal selection, the controller architecture 12 will automatically tune the NAV radios to the LOC frequency. In various embodiments when LNAV/VNAV becomes active, the controller architecture 12 manages the speed, In the computation of landing performance data, the controller architecture 12 may interface with various third-party off-board products which assist in the automated acquisition of this data, such as Go-direct. Alternatively, in various embodiments, the controller architecture 12 may utilize onboard products, such as satellite weather (SiriusXM) or upgraded ADS-B technology like FIS-B (Flight Information System Broadcast) that require various landing performance data (runway length, winds, temp, etc.) to be entered in to compute the various landing speeds and landing lengths. If the pilot is incapacitated, this cannot be entered, but there are various services the AC may subscribe to (The automatic flight planning service from Go-Direct) which could send digital uplinks to the aircraft to automatically enter this information into the FMS in lieu of pilot. Advantageously, getting this real-time information, rather than just using a 'worst case' assumption, increases the amount of runways the controller architecture 12 could pick because it doesn't have to throw out possible runways to only include the worst-case acceptable runways. In other embodiments, the algorithm executed by the controller architecture 12 picks an approach and landing airport that has a runway large enough to land the aircraft with a built-in safety-factor, regardless of landing performance data.

Prompts During Assist-to-Land Function

As mentioned, the assist-to-land function is intended for use with pilot engagement. One way to determine that a pilot is engaged (i.e., not incapacitated) is to involve the pilot in responding to prompts. In various embodiments, the controller architecture 12 will set a timer concurrently with displaying a proposed flight plan. The timer can serve as a prompt, and after a pre-programmed amount of time on the timer elapses, if the pilot has not interacted with the system 10, the controller architecture 12 may automatically activate the emergency land function by providing the EL activate command. In various embodiments, the pilot can delay the automatic activation of the emergency land function by re-setting the timer. Accordingly, avionic displays 32 provide a continuous and escalating series of prompts that require pilot confirmation to determine pilot is still conscious and taking the appropriate actions to notify ATC throughout the assist-to-land maneuver.

For example, if the pilot has filed an IFR plan (Instrument Flight Rules), automatically deviating from this plan without notifying ATC and without declaring an emergency (ex. squawking XPDR 7700) may result in a violation of IFR req's. Due to the fact that a pilot may avoid utilization of any such function that automatically declares an emergency, the pilot may be deterred from using the feature. The controller architecture 12 provides a technologically improved interface with the automatic prompting to the pilot to ensure the pilot is still in control of the aircraft and providing the necessary communications to ATC of the system behavior throughout the maneuver.

In various embodiments, the controller architecture 12 provides a visual and/or aural alert warning the pilot that a transition into emergency land if prompt will occur if not acknowledged. For example, if assist-to-land mode prompts the pilot, "Have you notified ATC of new flight plan route request?" and there is no response after X seconds, then pilot is presented with a message such as (in accordance with OEM input): "Confirm still awake and able to function?" (either acknowledged as Yes or not acknowledged)—if not acknowledged after Y seconds then prompt is presented saying "emergency land system will activate in Z seconds" and timer starts. If the pilot does not engage before the expiration of Z seconds (to override a transition into the emergency land function), the system 10 takes control by generating the EL activate command and consequently controlling the flying of the aircraft to a safe landing at a nearest suitable airport.

In various embodiments the controlling of the flying of the aircraft to a safe landing at a nearest suitable airport means flying the aircraft in accordance with the assist-to-land flight plan to the best airport/runway and respective approach type, described above.

In various embodiments, responsive to receiving the EL activate, the controller architecture 12 begins the EL function and commands the avionics displays 32 to automatically change the transponder code to 7700, coordinate to send additional datalink messages to ATC with automated messaging for regular updated position reports, an updated airport destination, a time to arrival, etc.; and, either perform automatic communications radio tuning or visual instructions shown on the MFD/TSC's to tune communication radios to allow for manual (or automatic) two-way communications between ATC and passengers.

Modulation of Flaps/Gear During Approach

As mentioned, during an assist-to-land, there can be manual deployment of flaps/gear, controlled by the pilot. In various embodiments, the display guidance for manual maneuvering to land the aircraft that is provided by the system 10 includes visual indications of points along the flight plan where configuration changes are required, which may be in the form of text boxes and banners displayed on the PFD. In various embodiments, the display guidance for manual maneuvering to land the aircraft that is provided by the system 10 also includes aural alerts when points along the flight plan are reached where configuration changes are required. These aural alerts may be in the form of a chime or vocal (speech) callouts such as "Deploy Flaps 10" or "Deploy Gear".

In other embodiments, while in assist-to-land or EL functions, the controller architecture 12 controls flap deployment at appropriate points along the approach profile by digitally manipulating the flap/flap handle as a tailorable OEM option. In an embodiment, the controller architecture 12 controls gear deployment at appropriate points along the approach profile by digitally manipulating the gear/gear handle as a tailorable OEM option.

In an embodiment, the controller architecture 12 controls flare maneuvers, and aligns the aircraft with a runway heading prior to touchdown. In an embodiment, the controller architecture 12 controls the rudder to keep the aircraft aligned with a runway centerline.

In an embodiment, the activation of landing lights during an assist-to-land, which is generally manually controlled by the pilot, is automated. The activation of landing lights is automated in the emergency land function. In another embodiment, during an assist-to-land, the controller architecture 12 generates visual and aural alerting to the crew to activate landing lights at an appropriate time during the approach.

In an embodiment, during the emergency land function, if the controller architecture 12 computes that a particular descent and speed profile is required, and the auto-thrust (AT's) are lower-power limited, the controller architecture 12 controls spoiler deployment to increase the descent rate or to slow down the descent rate.

In an embodiment, during the emergency land function, after the aircraft has slowed to a full stop after landing, the controller architecture 12 commands the engine controls to shut the engine down.

Low Altitude Approach Guidance

In certain cases, controller architecture 12 may not have the ability to provide guidance to a sufficiently low altitude for assist-to-land functions. Examples being in cases where GPS approach is unavailable or insufficient due to lack of satellite constellation coverage. In other cases, the FMS 36 may have the capability to provide guidance down to suitable altitudes and secondary approach method may not be required.

In some embodiments, a visual camera system is installed on the aircraft to provide a means of runway identification. The FCS 38 may translate visual imagery to direct deviations to provide low approach guidance down to the runway threshold. In various embodiments, the avionics displays 32 provide visual prompting to assist in the visual location of the runway.

FIGS. 4-5 are illustrations of steps in operational use cases for the assist-to-land function and for the emergency land function. Many of the steps in FIGS. 4-5 can be viewed as steps of a method for an aircraft in low visibility. In FIG. 4, vertical profile 400 is displayed above lateral profile 402, and it is understood that these two profiles sync up for an exemplary flight path. At 404 the system 10 determines that the aircraft has cleared a pre-programmed minimum altitude requirement and makes the assist-to-land function available. At 406, responsive to receiving a manual activation of the assist-to-land function, the system 10 begins the assist-to-land function, as described above. At 408, the controller architecture 12 commands the FMS 36 to compute the best airport considering weather (WX), terrain, and other inputs. The various flight guidance features described above are then implemented until the aircraft lands at the optimal airport 410.

In FIG. 5, vertical profile 500 is displayed above lateral profile 502, and it is understood that these two profiles sync up for an exemplary flight path. At 504 the emergency land function becomes available, as the aircraft has cleared a pre-programmed minimum altitude requirement. At 506, the assist-to-land function or mode is activated manually or automatically as described above. At 508, the controller architecture 12 commands the FMS 36 to compute the best airport considering weather (WX), terrain, and other inputs. The various flight guidance features described above are then implemented until the aircraft lands at the optimal airport 510.

Although an exemplary embodiment of the present disclosure has been described above in the context of a fully-functioning computer system (e.g., flight guidance system 10 described above in conjunction with FIGS. 1-3), those skilled in the art will recognize that the mechanisms of the present disclosure are capable of being distributed as a program product (e.g., an Internet-disseminated program or software application) and, further, that the present teachings apply to the program product regardless of the particular type of computer-readable media (e.g., hard drive, memory card, optical disc, etc.) employed to carry-out its distribution. In certain implementations, the flight guidance system may include GUI components, such as ARINC 661 components, which may include a User Application Definition File ("UADF"). As will be appreciated by one skilled in the art, such a UADF is loaded into the light guidance system and defines the "look and feel" of the display, the menu structure hierarchy, and various other static components of the GUI with which a pilot or other user interacts.

Terms such as "comprise," "include," "have," and variations thereof are utilized herein to denote non-exclusive inclusions. Such terms may thus be utilized in describing processes, articles, apparatuses, and the like that include one or more named steps or elements, but may further include additional unnamed steps or elements. While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. Various changes may be made in the function and arrangement of elements described in an exemplary embodiment without departing from the scope of the invention as setforth in the appended Claims.

What is claimed is:

1. A flight guidance system for an aircraft, comprising:
a source of aircraft status data;
a display device configured to render an avionic display showing a location and trajectory of the aircraft;
a source configured to provide an emergency land (EL) activate command; and
a controller architecture operationally coupled to the source of aircraft status data, the display device, and the source configured to provide the emergency land (EL) activate command, the controller architecture programmed by programming instructions to:
begin an EL function responsive to the EL activate command, the EL activate command being automatically generated responsive to detecting a lack of pilot response to a prompt for a tailorable threshold of time;

while in the EL function, perform the operations of:
selecting a nearest suitable airport and associated route;
actively controlling an automatic pilot (AP) and an auto-thrust (AT) system to fly the aircraft along the route to a final approach fix;
automatically communicating with air traffic control (ATC);
automatically configuring the aircraft for landing; and
automatically landing the aircraft at the nearest suitable airport; and control a rudder to keep the aircraft aligned with a runway centerline, as part of a safe landing.

2. The system of claim 1, wherein the controller architecture is further programmed to automatically configure the aircraft for landing by controlling a flap deployment by digitally manipulating a flap/flap handle at appropriate points along an approach profile of the route.

3. The system of claim 1, wherein the controller architecture is further programmed to communicate with the ATC by:
commanding the avionics display to automatically change a transponder code to 7700; and
sending datalink messages to the ATC with automated messaging including regular updated position reports, an updated airport destination, and a time to arrival.

4. The system of claim 1, wherein the controller architecture is further programmed to:
control flare maneuvers during the safe landing; and
the safe landing includes aligning the aircraft with a runway heading prior to touchdown.

5. A flight guidance method for an aircraft comprising:
at a controller architecture comprising a processor, performing the operations of:
receiving aircraft status data;
commanding a display device to render an avionic display showing a location and trajectory of the aircraft;
receiving an activate an emergency land (EL) activate command;
beginning an EL function responsive to the EL activate command, the EL activate command being automatically generated responsive to detecting a lack of pilot response to a prompt for a tailorable threshold of time;
while in the EL function, performing the operations of:
selecting a nearest suitable airport and associated route;
actively controlling an automatic pilot (AP) and an auto-thrust (AT) system to fly the aircraft along the route to a final approach fix;
automatically communicating with air traffic control (ATC);
automatically configuring the aircraft for landing; and
automatically landing the aircraft at the nearest suitable airport; and
controlling a rudder to keep the aircraft aligned with a runway centerline, as part of a safe landing.

6. The method of claim 5, further comprising automatically configuring the aircraft for landing by controlling a flap deployment by digitally manipulating a flap/flap handle at appropriate points along an approach profile of the route.

7. The method of claim 5, further comprising:
commanding the avionics display to automatically change a transponder code to 7700; and
sending datalink messages to the ATC with automated messaging including regular updated position reports, an updated airport destination, and a time to arrival.

8. The method of claim 5, further comprising:
controlling flare maneuvers during the safe landing; and
the safe landing includes aligning the aircraft with a runway heading prior to touchdown.

9. A flight guidance system for an aircraft, comprising:
at least one processor; and
at least one memory communicatively coupled to the at least one processor, the at least one memory comprising instructions that upon execution by the at least one processor, cause the at least one processor to
receive aircraft status data;
command a display device to render an avionic display showing a location and trajectory of the aircraft;
receive an activate an emergency land (EL) activate command;
begin an EL function responsive to the EL activate command, the EL activate command being automatically generated responsive to detecting a lack of pilot response to a prompt for a tailorable threshold of time;
while in the EL function, performing the operations of:
selecting a nearest suitable airport and associated route;
actively controlling an automatic pilot (AP) and an auto-thrust (AT) system to fly the aircraft along the route to a final approach fix;
automatically communicating with air traffic control (ATC);
automatically configuring the aircraft for landing; and
automatically landing the aircraft at the nearest suitable airport; and
controlling a rudder to keep the aircraft aligned with a runway centerline, as part of a safe landing.

10. The system of claim 9, wherein the at least one memory comprises further instructions that upon execution by the at least one processor, cause the at least one processor to automatically configure the aircraft for landing by controlling a flap deployment by digitally manipulating a flap/flap handle at appropriate points along an approach profile of the route.

11. The system of claim 9, wherein the at least one memory comprises further instructions that upon execution by the at least one processor, cause the at least one processor to:
command the avionics display to automatically change a transponder code to 7700; and
send datalink messages to the ATC with automated messaging including regular updated position reports, an updated airport destination, and a time to arrival.

12. The system of claim 9, wherein the at least one memory comprises further instructions that upon execution by the at least one processor, cause the at least one processor to:
control flare maneuvers during the safe landing; and the safe landing includes aligning the aircraft with a runway heading prior to touchdown.

* * * * *